(12) United States Patent
Baudart et al.

(10) Patent No.: US 11,796,837 B2
(45) Date of Patent: *Oct. 24, 2023

(54) METHOD FOR OPTIMIZING A SET OF OPTICAL LENS BLANKS

(71) Applicant: Essilor International, Charenton-le-Pont (FR)

(72) Inventors: Thierry Baudart, Charenton-le-Pont (FR); Florence Morel, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 364 days.

This patent is subject to a terminal disclaimer.

(21) Appl. No.: 17/149,609

(22) Filed: Jan. 14, 2021

(65) Prior Publication Data

US 2021/0132408 A1 May 6, 2021

Related U.S. Application Data

(63) Continuation of application No. 15/113,694, filed as application No. PCT/EP2015/051024 on Jan. 20, 2015, now Pat. No. 10,928,652.

(30) Foreign Application Priority Data

Jan. 22, 2014 (EP) .................... 14305089

(51) Int. Cl.
*G02C 7/02* (2006.01)
*B29D 11/00* (2006.01)

(52) U.S. Cl.
CPC ........ *G02C 7/028* (2013.01); *B29D 11/00961* (2013.01); *G02C 7/027* (2013.01); *G02C 2202/08* (2013.01)

(58) Field of Classification Search
CPC .......... G02C 7/02; G02C 7/022; G02C 7/024; G02C 7/025; G02C 7/027; G02C 7/028;
(Continued)

(56) References Cited

U.S. PATENT DOCUMENTS 3,960,442 A 6/1976 Davis
4,838,675 A 6/1989 Barkan
(Continued)

FOREIGN PATENT DOCUMENTS

GB 2040481 8/1980
JP 2007-240553 A 9/2007
(Continued)

OTHER PUBLICATIONS

Robert Fischer; Biljana Tadic-Galeb; Paul Yoder: Optical System Design, Second Edition. Optical Manufacturing Considerations, Chapter (McGraw-Hill Professional, 2008), AccessEngineering (Year: 2008).*
(Continued)

*Primary Examiner* — Nicholas R. Pasko
(74) *Attorney, Agent, or Firm* — Oblon, McClelland, Maier & Neustadt, L.L.P.

(57) ABSTRACT

Method implemented by computer for optimizing a set of optical lens blanks used to manufacture a set of optical lenses, each optical lens comprising first and second optical surfaces, the first and second optical surfaces being connected by a external periphery surface, the method comprising: a data providing step during which a set of data for every optical lens of the set of optical lenses is provided, the data comprising at least contour data representative of an external periphery surface of the optical lens, a first dataset representative of the first optical surface of the optical lens and a second dataset representative of the second optical surface of the optical lens; a supply cost function providing (Continued)

step during which a supply cost function is provided, the supply cost function being a function of the number of different optical lens blank comprised in the set of optical lens blanks.

11 Claims, 2 Drawing Sheets

(58) Field of Classification Search
CPC . G02C 7/04; G02C 7/041; G02C 7/06; G02C 7/061; G02C 7/063; G02C 7/066; G02C 7/068; G02C 7/088; G02C 2202/02; G02C 2202/04; G02C 2202/06; G02C 2202/08; G02C 2202/22; B24B 1/00; B24B 9/14; B24B 11/00961; B24B 13/00; B24B 13/0055; B24B 13/06; B29D 11/00961; G05B 2219/36384; G05B 2219/45175; A61B 3/04; G06F 17/50; A61F 2/1637; A61F 2/164; A61F 2/1645
USPC ...... 351/41, 159.01, 159.41, 159.42, 159.45, 351/159.48, 159.73, 159.74, 159.75, 351/159.76, 159.77, 178; 700/97; D16/101; 703/2; 623/6.23

See application file for complete search history.

(56) References Cited

U.S. PATENT DOCUMENTS

| | | | |
|---|---|---|---|
| 6,089,710 | A | 7/2000 | Zeidler |
| 6,554,426 | B2 | 4/2003 | Shirayanagi |
| 6,631,988 | B2 | 10/2003 | Shirayanagi |
| 6,655,803 | B1 | 12/2003 | Rubinstein |
| 6,755,525 | B2 | 6/2004 | Reichow et al. |
| 8,308,294 | B2 | 11/2012 | Dubois |
| 8,313,194 | B2 | 11/2012 | Colas |
| 10,928,652 | B2* | 2/2021 | Baudart .................. G02C 7/027 |
| 2010/0283965 | A1* | 11/2010 | Dubois ............ B29D 11/00009 |
| | | | 351/159.76 |
| 2012/0016644 | A1* | 1/2012 | De Rossi ................. G02C 7/02 |
| | | | 703/2 |
| 2012/0057123 | A1 | 3/2012 | Mandler |
| 2012/0140169 | A1 | 6/2012 | Mandeler |

FOREIGN PATENT DOCUMENTS

| | | |
|---|---|---|
| WO | 2013072065 | 5/2013 |
| WO | 2013072249 | 5/2013 |

OTHER PUBLICATIONS

International Search Report and Written Opinion dated Apr. 14, 2015; International PCT Application No. PCT/EP2015/051024.
Result of consultation issued Mar. 22, 2023, in corresponding European Patent Application No. 15 700 723.8, 41pages.

* cited by examiner

METHOD FOR OPTIMIZING A SET OF OPTICAL LENS BLANKS

CROSS-REFERENCE TO RELATED APPLICATIONS

This application is a continuation application of and is based upon and claims the benefit of priority under 35 U.S.C. § 120 from U.S. Ser. No. 15/113,694, filed on Jul. 22, 2016, herein incorporated by reference, which is a National Stage Application of International Application No. PCT/EP2015/051024, filed Jan. 20, 2015. The present document also incorporates by reference the entire contents of Europe priority document, 14305089.6, filed Jan. 22, 2014.

TECHNICAL FIELD

The invention relates to a method for optimizing a set of optical lens blanks to be used to manufacture a set of optical lenses and to a method of manufacturing an ophthalmic lens.

The invention further relates to a computer program product comprising one or more stored sequence of instruction that is accessible to a processor and which, when executed by the processor, causes the processor to carry out the steps of the methods according to the invention.

BACKGROUND

The discussion of the background of the invention herein is included to explain the context of the invention. This is not to be taken as an admission that any of the material referred to was published, known or part of the common general knowledge at the priority date of any of the claims.

An optical lens is generally manufactured in accordance with the wearer specifications. In the case, for example, of an ophthalmic lens for the correction or improvement of eyesight, the ophthalmic lens is manufactured according to a wearer prescription corresponding to the visual requirements of that wearer. In addition, the shape and size of the spectacle frame supporting the ophthalmic lens is taken into account. At least one of the surfaces of the ophthalmic lens is processed to provide an ophthalmic lens according to the wearer prescription. The contour of the ophthalmic lens is edged according to the shape of the spectacle frame on which the ophthalmic lens is to be mounted.

An optical lens is generally manufactured from an optical lens blank such as a semi-finished lens blank. A semi-finished lens blank generally has two opposing surfaces at least one of which is unfinished.

The unfinished surface of the lens blank is machined according to the wearer's prescription to provide the required surface of the optical lens. An optical lens having finished back and front surfaces is often referred to as an uncut optical lens. The uncut optical lens is edged according to a shape of a spectacle frame of the optical lens in order to obtain an edged or cut optical lens.

According to further manufacturing processes an optical lens may be obtained by machining both surfaces of an optical lens blank. With the increasing trend to larger and larger spectacle frames, for example wrap or shield style spectacle frames, the problem of producing optical lens from optical lens blank is more and more complex.

For example as illustrated on FIG. 1 in the case where the frame on which the optical lens 10 is to be mounted is shaped such that the nasal (d2) and temporal (d1) distances, respectively defining the distance between the optical reference point OP and the nasal and temporal edges, are dissymmetric, a lens blank having a significantly larger diameter is required in order to be of sufficient size to enable an optical lens of the required size to be obtained.

This leads to wastage of the optical material of the optical lens blank.

Therefore, it appears that there is a need to optimize the set of optical lens blank that is to be used to manufacture a set of optical lenses.

SUMMARY

To this end, the invention proposes a method, for example implemented by computer means, for optimizing a set of optical lens blanks to be used to manufacture a set of optical lenses, each optical lens comprising a first optical surface, a second optical surface, the first and second optical surfaces being connected by a external periphery surface, the method comprising:

a data providing step during which a set of data for every optical lens of the set of optical lenses is provided, the data comprising at least contour data representative of an external periphery surface of the optical lens, a first dataset representative of the first optical surface of the optical lens and a second dataset representative of the second optical surface of the optical lens;

a supply cost function providing step during which a supply cost function is provided, the being a function of the number of different optical lens blank comprised in the set of optical lens blanks, a lens blank cost function providing step during which a lens blank cost function is provided, the lens blank cost function being a function of the price of the optical lens blanks comprised in the set of optical lens blanks, a material cost function providing step during which a material cost function is provided, the material cost function being a function of the quantity of material to be removed from an optical lens blank so as to provide an optical lens adapted to the provided data, a lens blank optimization step during which the number and the contours of the different lens blanks comprised in the set of lens blanks to be used to manufacture the set of optical lenses adapted to the provided data and that minimizes a global cost function is determined, the global cost function being a weighted sum of the supply cost function, the lens blank cost function and the material cost function with the weights of the cost functions different from zero.

Advantageously, the method according to the invention allows providing an optimized set of optical lens blank that allows manufacturing all of the optical lenses comprised in the set of optical lenses and may be optimized in terms of number of different lens blanks and/or price of the different optical lens blanks and amount of material to be removed from the optical lens blanks to manufacture the optical lenses.

In other words, unlike what was done up to now, the method of the invention allows providing a set of optical lens blanks that is a compromise between the price of the optical lens blanks, the material cost and logistic cost.

According to further embodiments which can be considered alone or in combination:

the provided data further comprise a reference direction and an optical reference point located on the first optical surface, wherein the contour data, the first face dataset and the second face dataset are provided in respect with a reference frame, wherein the reference frames are centered on said optical reference point, and comprising the reference direction as an axis; and/or the set of provided data corresponds to a forecast of optical lenses to be manufactured from the set of optical lens blanks; and/or the set of provided data corresponds to a set of previously manufactured of optical lenses; and/or during the lens blank optimization step, the contour of every lens blank of the set of optical lens blanks is optimized; and/or during the lens blank optimization step, the thickness of every lens blank of the set of optical lens blanks is optimized;

the supply cost function is arranged to that the number of different optical lens blanks comprised in the set of optical lens blanks is smaller than or equal to 3; and/or the first and second dataset of said set of provided data further comprise prescription data; and/or the optical lens blanks comprised in the set of optical lens blank have a finished surface with a geometrical center reference point and an unfinished surface; and/or during the lens blank optimization step, the curvature radius of the unfinished surface of every lens blank of the set of optical lens blanks is optimized; and/or the finished surface of every optical lens blank of the set of optical lens blanks is spherical; and/or all the optical lens blanks of the set of optical lens blanks have a spherical finished surface with a same curvature radius; and/or the contour data relate to the geometrical shape of the contour and/or the size or diameter of the contour; and/or the contour of the different lens blanks comprises the geometrical shape of the contour and/or the size or diameter of the contour; and/or the optical lenses to be manufactured comprise a first surface comprised in the finished surface of the optical lens blank, during the lens blank optimization step, when determining the global cost function, the number and the contours of the different lens blanks comprised in the set of lens blanks are processed by:

providing contour data defining the contour of the first surface of the optical lens in a finished cut state, virtually offsetting the optical reference point of the optical lens over the first surface with respect to the geometrical center reference point of the unfinished optical lens blank such that when the contour of the optical lens is offset in correspondence with the offset optical reference point, the offset contour is within the boundaries of the first surface of the optical lens blank.

The invention also relates to a method of providing, for example of manufacturing, an ophthalmic lens. The method comprises:

a prescription data providing step, during which prescription data are provided, an optical design providing step during which an optical design of the ophthalmic lens is provided, spectacle frame data providing step during which spectacle frame data and mounting data are provided, an optical lens blank selecting step during which a optical lens blank is selected in the set of optical lens blank optimized by a method according to any of the preceding claims, machining the optical lens blank selected during the optical lens blank selecting step so as to provide an ophthalmic lens corresponding to the prescription, to the optical design, the mounting data and spectacle frame data. According to a further aspect, the invention relates to a computer program product comprising one or more stored sequence of instruction that is accessible to a processor and which, when executed by the processor, causes the processor to carry out the steps of the methods according to the invention.

According to another aspect the invention relates to a program which makes a computer execute the method of the invention.

The invention also relates to a computer readable medium carrying one or more sequences of instructions of the computer program according to the invention.

The invention further relates to a computer-readable storage medium having a program recorded thereon; where the program makes the computer execute the method of the invention.

The invention relates to a device comprising a processor adapted to store one or more sequence of instructions and to carry out at least one of the steps of a method according to the invention.

BRIEF DESCRIPTION OF THE DRAWINGS

Non limiting embodiments of the invention will now be described with reference to the accompanying drawing wherein.

Figure 4:
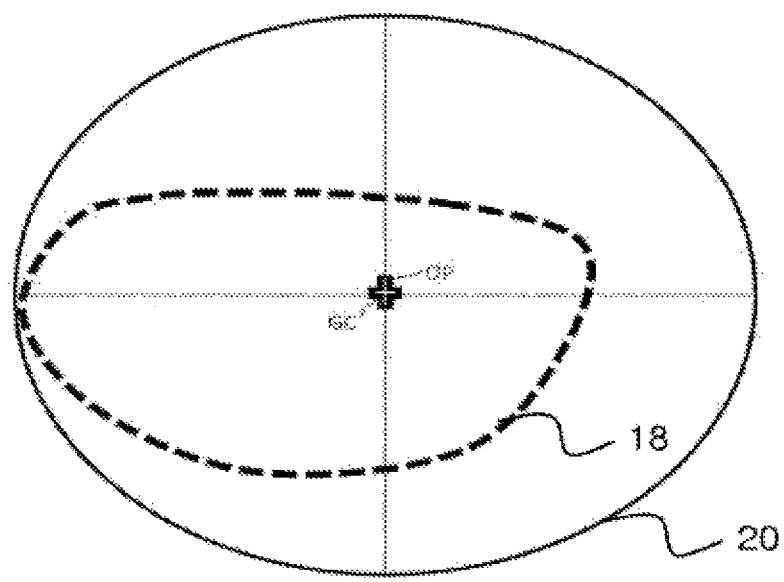
FIG. 4 is a schematic planar view from above of an unfinished optical lens blank.
Figure 1:
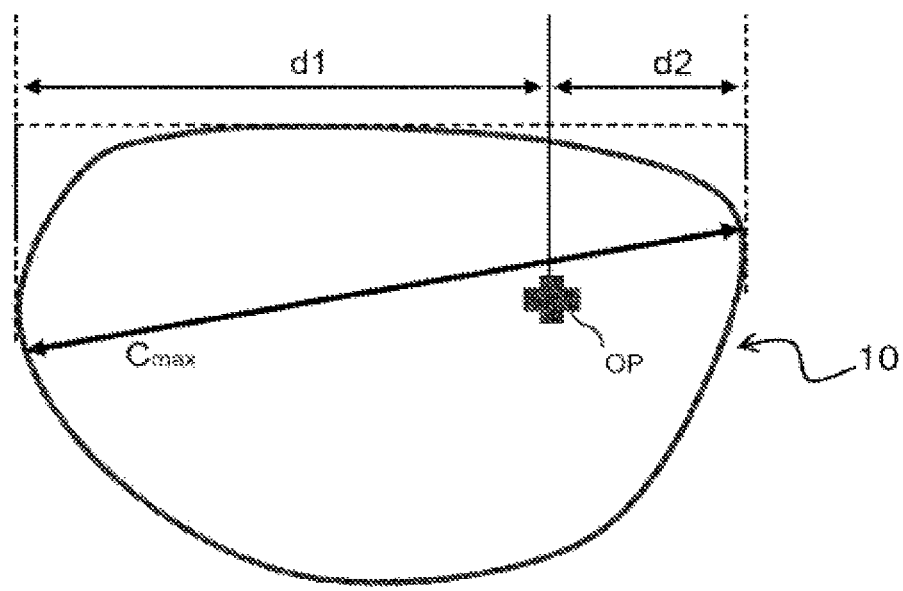
FIG. 1 is a schematic planar view from an edged optical lens.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION

In the framework of the invention, the following terms have the meaning indicated herein below.

The term "optical lens" is to be understood to mean any type of known lens intended to be supported by a wearer's face. The term can refer to ophthalmic lenses such as non-corrective lenses, semi-finished lens blanks and corrective lenses, such as progressive addition lenses, unifocal or multifocal lenses. The term can also refer to said ophthalmic lenses which could present at least one added value such as, for example, tint, polarization filtering, electrochromism, antireflective properties, anti-scratch properties or comprise a photochromic unit or a light guide unit, . . .

The term "prescription" is to be understood to mean a set of optical characteristics of optical power, of astigmatism, of prismatic deviation, and, where relevant, of addition, determined by an ophthalmologist or optometrist in order to correct the vision defects of the wearer, for example by means of a lens positioned in front of his eye. For example, the prescription for a progressive addition lens comprises values of optical power and of astigmatism at the distance-vision point and, where appropriate, an addition value. The prescription data may include data for emmetrope eyes.

The optical reference point, often referred to as the optical centre, is defined from the point of an intersection of the primary gaze position, coincident with a pupil position of a wearer, and the front surface of the optical lens when mounted on a frame worn by the wearer. In the case where the optical lens includes a prism, the optical reference point defines the point on the front surface of the optical lens at which the prismatic effect of the finished optical lens is determined. Such a reference point is often referred to as the prism reference point (PRP).

The "optical reference point" is located at the same position as the fitting cross when the optical lens is a unifocal lens, The "optical reference point" is determined from the position of the fitting cross, for example the optical reference point is located 4 mm below the fitting cross and spaced 2.5 mm laterally on the nasal side of the lens, when the lens is progressive addition lens.

The "fitting cross" is a temporary marking written on the finished surface of the optical lens blank and on the finished surface of the optical lens. If the temporary markings are absent or have been erased, it is always possible for a skilled person to position the control points on the lens by using a mounting chart and permanent micro-markings. The invention relates to a method, for example implemented by computer means, for optimizing a set of optical lens blanks to be used to manufacture a set of optical lenses.

The set of optical lens blanks is optimized so that each optical lens of the set of optical lenses to be manufactured may be manufactured starting from at least one of the optical lens blanks. In particular, at least one of the optical lens blank is to have a diameter and a thickness large enough for enabling to manufacture each optical lens of the set of optical lenses to be manufactured.

Figure 2:
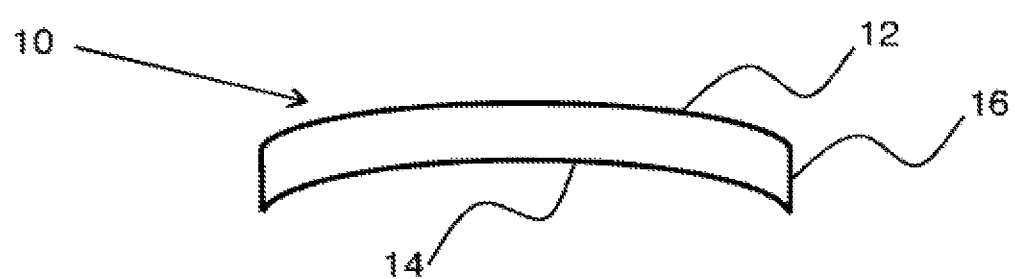
FIG. 2 illustrates an optical lens to be manufactured.

As illustrated on FIG. 2, each optical lens 10 of the set of optical lens to be manufactured composes a first optical surface 12, a second optical surface 14 and an external periphery surface 16 connecting the first 12 and second 14 optical surfaces.

While in FIG. 2, the first optical surface is the front surface of the optical lens and the second optical surface is the back surface, it will be understood, that in alternative embodiments of the invention the first optical surface may be the back surface of the optical lens and the second optical surface may be the front surface.

Furthermore, although the first optical surface 12 is represented in FIG. 2 as convex and the second optical surface 14 as concave, it will be appreciated that the first optical surface 12 could equally well be concave or any other curved surface and that the second optical surface 14 could equally well be convex or any other curved surface.

The set of optical lenses to be manufactured may correspond to a set of previously manufactured optical lenses. Typically, the set of optical lenses considered in the optimization method of the invention corresponds to the optical lenses manufactured by a lens manufacturer over a past period of time, for example over the last month or the last six months or the last year.

The set of optical lenses to be manufactured may correspond to a forecast of optical lenses to be manufactured. The forecast of optical lenses may be obtained according to previously manufactured optical lenses and/or to new type of optical lenses the manufacturer may have to manufacture.

Figure 3:
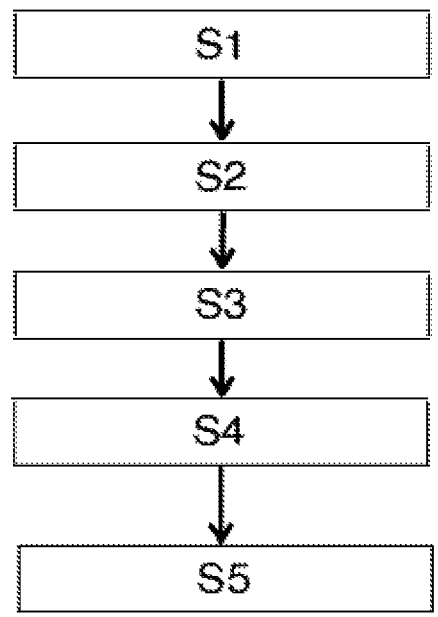
FIG. 3 is a flowchart of a method according to the invention.

As illustrated on FIG. 3, the method of optimization according to the invention comprises at least:

a data providing step SI,
a supply cost function providing step S2,
a lens blank cost function providing step S3,
a material cost function providing step S4, and
a lens blank optimization step S5. During the data providing step SI, a set of data for every optical lens of the set of optical lenses to be manufactured is provided.

The data comprising at least contour data, a first and a second set of data for each of the optical lens of the set of optical lenses to be manufactured.

The contour data are data representative of the external periphery surface 16 of each optical lens 10.

The first set of data is representative of the first optical surface 12 of each optical lens.

The second set of data is representative of the second optical surface 14 of each optical lens 10.

According to an embodiment of the invention, the data may further comprise for each optical lens of the set of optical lens to be manufactured a reference direction and an optical reference point located on the first optical surface. According to such embodiment, the contour data, the first optical surface and the second optical surface are provided in respect to a reference frame centered on the optical reference point and comprising the reference direction as an axis.

According to an embodiment of the invention, at least part of the optical lenses to be manufactured, for example all of the optical lenses to be manufactured, are ophthalmic lenses.

When the optical lenses to be manufactured are ophthalmic lenses the first and second set of data may comprise prescription data providing an indication concerning the required prescription. During the supply cost function providing step S2, a supply cost function is provided. The supply cost function is function of at least the number of different optical lens blanks comprised in the set of optical lens blanks.

Typically the supply cost function is directly proportional to the number of different optical lens blanks in the set of optical lens blanks.

According to an embodiment of the invention, the supply cost function may be arranged so that the number of optical lens blank comprised in the set of optical lens blanks remains below a determined number.

The inventors have observed that when all the optical lens blanks have the at least one of the surfaces with a common curvature radius, having three different optical lens blanks in the set of optical lens blanks appears to be an optimized number. Indeed, the inventors have observed that basing more than three different optical lens blanks increases greatly the storage and selection requirements. However, having only two optical lens blanks in the set of optical lens blanks reduces the possibility of optimizing the other parameters of the optical lens blanks.

During the lens blank cost function providing step S3 a lens blank cost function is provided. The lens blank cost function is a function of the price of the optical lens blanks comprised in the set of optical lens blanks. The price of the optical lens blanks may depend among other elements on the material of the optical lens blanks, in particular the refractive index of the material used and the complexity of the surfaces of each face of the optical lens blank.

During the material cost function providing step S4 a material cost function is provided. The material cost function is a function of the quantity of material to be removed from an optical lens blank so as to provide an optical lens adapted to the provided data. In other words, the material cost function is related to the amount of spare material and/or chip of each optical lens blank.

During the lens blank optimization step S5, a global cost function is minimized.

The global cost function may be function of the supply cost function, lens blank cost function and the material cost function.

For example, the global cost function is a weighted sum of the supply cost function, the lens blank cost function and the material cost function with the weight of at least one, preferably at least two, of the cost functions is/are different from zero.

During the lens blank optimization step, parameters of the set of optical lens blanks that minimize the global cost function are determined.

Among the parameters of the set of optical lens blanks that are determined during the lens blank optimization step, the number of optical lens blank in the set and the contour geometrical shapes and/or sizes of the different lens blanks comprised in the set of lens blanks are determined so as to minimize the global cost function.

Typically, during the lens blank optimization step S5, the contour geometrical shape of every optical lens blank of the set of optical lens blanks is optimized. In other words, during the lens blank optimization step S5, the contour geometrical shape of each optical lens blank of the set of optical lens blanks that minimizes the global cost function is determined.

Typically, the different optical lens blanks of the set of optical lens blank may have different diameters. For example, if most of the optical lenses to be manufactured may be manufactured from optical lens blanks having a diameter of 50 mm, there is no need to have all of the optical lens blanks have a diameter of 60 mm, at least one of the optical lens blanks of the set of optical lens blank may lave a diameter of 50 mm.

According to an embodiment of the invention, the data relating to the optical lenses to be manufactured may comprise spectacle frame data relating at least to the shape of the spectacle name in which the optical lens is to be mounted and mounting data relating at least to the mounting parameters of the optical lens on the spectacle frame. Advantageously, during the optimization step the contour of every optical lens blank can be optimized considering the final shape and mounting parameters of the optical lens. Therefore, the set of optical lens blank is optimized not only considering the machining step but also the edging step required to mount the manufactured optical lens in to the spectacle frame.

According to an embodiment of the invention, during the lens blank optimization step S5, the thickness of every lens blank of the set of optical lens blanks is optimized. Indeed optical lens blanks need to be at least as thick as the optical lenses to be manufactured but so as to reduce the machining tune and the waits of material the thickness of the optical lens blanks may be optimized. Typically, the different optical lens blanks of the set of optical lens blank may have different thickness.

According to an embodiment, the optical lens blanks comprised in the set of optical lens blanks have two unfinished surfaces. Both surfaces of the optical lens blanks are manufactured so as to obtain the optical lenses.

According to another embodiment, all the optical lenses of the set of optical lenses (10) comprise a face having a same curvature and all the optical lens blanks comprised in the set of optical lens blanks have a finished surface with a geometrical center reference point and an unfinished surface. The finished surface of the all the optical lens blanks of the set of optical lens blank preferably has the same curvature.

The geometrical center reference point corresponds to the intersection of the horizontal and vertical centerlines of an optical lens blank.

Advantageously, the curvature radius of the unfinished surface of the optical lens blanks may be optimized during the lens blank optimization step, in particular so as to reduce the material cost function.

The finished surfaces of the optical lens blanks may be spherical, for example all the finished surfaces of the optical lens blanks of the set of optical lens blanks may have the same curvature.

Typically, when manufacturing an optical lens, an optical reference point is defined on the optical blank to provide a reference for when the finished optical lens is mounted on a spectacle frame. Typically this optical reference point is located on a finished surface if any of the lens blank or inserted between the two unfinished surfaces of the lens blank.

An example of a lens blank from which an optical lens is manufactured is illustrated in FIG. 4. The lens blank 20 has a generally cylindrical shape with a cylindrical right section but the section may have other shape such as an elliptic shape or a rectangular shape. The geometrical shape of the different lens blanks comprised in the set of lens blanks may be optimized dining the lens blank optimization step S5.

The contour 18 of the optical lens to be manufactured from the unfinished blank 20 is outlined within the unfinished optical blank, and the optical reference point OP of the optical lens is defined.

The contour 18 which represents the edge of the finished optical lens may be defined according to the shape of the frame supporting the optical lens.

In general, in order to facilitate processing during manufacture of the optical lens, the optical reference point OP of the finished optical lens coincides with the geometrical centre reference point GC of the lens blank 20.

When manufacturing the optical lens the optical reference point OP and the geometrical centre reference point GC generally correspond to the rotational axis of the processing device for processing the unfinished surface of the lens blank.

In some cases, in order to enable large diameter dissymmetric optical lenses to be produced from standard sized lens blanks, the optical reference point of the optical lens to be manufactured is offset from the geometrical central reference point of the lens blank by a constant value, ie. without any connection with the frame shape.

When processing the unfinished surface of the optical lens, the unfinished surface of the lens blank is blocked at the optical reference point such that the optical reference point coincides with the rotational axis of the processing device for processing the unfinished surface of the lens.

Such constant offset may be considered during the lens blank optimization step, in particular to optimize the size of the optical lens blanks in the set of optical lens blanks.

According to a further embodiment of the invention, the number and the contour geometrical shapes or sizes of the different lens blanks comprised in the set of optical lens blanks may be optimized using a virtual offsetting.

According to such embodiment, the provided data comprise an optical reference point located on the first optical surface of each optical lens to be manufactured. The optical lens blanks are semi-finished lens blanks. The finished surfaces of the lens blanks are spherical and all have the same curvature radius. The first surface of the manufactured optical lenses is comprised in the finished surface of the optical lens blank. In other words, the first surface of the manufactured optical lenses is spherical and has the same curvature radius than the finished surfaces of the lens blanks.

During the lens blank optimization step, the number and the contours of the lens blanks are processed by:

providing contour data defining the contour of the first surface of the optical lens in a finished cut state, virtually offsetting the optical reference point of the optical lens over the first surface with respect to the geometrical center reference point of the optical lens blank such that when the contour of the optical lens is offset in correspondence with the offset optical reference point, the offset contour is within the boundaries of the first surface of the optical lens blank.

By virtually offsetting is meant determining the position of the optical lens yet to be manufactured within the lens blank such that the determined optical reference point on the first surface of the optical lens, is offset with respect to the geometrical centre reference point of the unfinished lens blank from which the optical lens is manufactured.

The invention has been described above with the aid of embodiments without limitation of the general inventive concept.

Many further modifications and variations will be apparent to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for optimizing a set of optical lens blanks, each optical lens blank of the set of optical lens blanks including a first optical surface, and a second optical surface, the first and second optical surfaces being connected by an external periphery surface, the method comprising:

obtaining a set of data for each optical lens of a set of optical lenses, the set of data including at least contour data representative of the external periphery surface of the respective optical lens, a first dataset representative of the first optical surface of the respective optical lens, and a second dataset representative of the second optical surface of the respective optical lens;

obtaining a supply cost function, the supply cost function including a function of a number of different optical lens blanks includable in the set of optical lens blanks;

obtaining a lens blank cost function, the lens blank cost function including a function of a price of the optical lens blanks includable in the set of optical lens blanks;

obtaining a material cost function, the material cost function including a function of a quantity of material to be removed from an optical lens blank; and determining a non-zero number and contours of different optical lens blanks includable in the set of optical lens blanks;

determining at least one optical lens blank for the set of optical lens blanks that minimizes a global cost function, the global cost function including a weighted sum of the supply cost function, the lens blank cost function, and the material cost function with weights of the supply cost function, the lens blank cost function, and the material cost function being different from zero, and manufacturing a set of optical lenses based on the determined number and contours of the set of optical lens blanks, wherein each optical lens blanks included in the set of optical lens blanks is a semi-finished optical lens blank having a finished surface with a geometrical center reference point and an unfinished surface, wherein during the determining of the non-zero number and contours of different optical lens blanks, a curvature radius of an unfinished surface of the different optical lens blanks is considered, wherein each optical lens blank included in the set of optical lens blanks has a spherical finished surface with a same curvature radius.

2. The method according to claim 1, wherein the set of data further includes a reference direction and an optical reference point located on the first optical surface, wherein the contour data, the first dataset and the second dataset are provided with respect to a reference frame, wherein the reference frame is centered on the optical reference point, and the reference direction is provided as an axis.

3. The method according to claim 1, wherein the set of data includes to a forecast of the set of optical lenses to be manufactured from the set of optical lens blanks.

4. The method according to claim 1, wherein the set of data corresponds to a set of previously manufactured optical lenses.

5. The method according to claim 1, wherein during the determining of the non-zero number and contours of different optical lens blanks, a thickness of each optical lens blank includable in the set of optical lens blanks, is considered.

6. The method according to claim 1, wherein a number of different optical lens blanks included in the set of optical lens blanks is less than or equal to 3.

7. The method according to claim 1, wherein the first dataset and the second dataset of the set of data further includes prescription data.

8. The method according to claim 1, wherein a finished surface of every optical lens blank of the set of optical lens blanks is spherical.

9. The method according to claim 8, wherein the set of data further includes a reference direction and an optical reference point located on the first optical surface, wherein the contour data, the first dataset and the second dataset are provided with respect to a reference frame, the reference frame is centered on the optical reference point, and the reference direction is provided as an axis, and wherein the set of optical lenses to be manufactured comprises the first optical surface comprised of the finished surface of the optical lens blank, wherein during the determining of the non-zero number and contours of different optical lens blanks, the contour data defining the contour of the first optical surface of the optical lens in a finished cut state, including in the set of optical lens blanks, are processed by:

virtually offsetting the optical reference point of the optical lens over the first optical surface with respect to the geometrical center reference point of the unfinished surface of the optical lens blank such that when the contour of the optical lens is offset in correspondence with the offset optical reference point, an offset contour is within boundaries of the first optical surface of the optical lens blank.

10. The method according to claim 1, wherein the contour data relate to a geometrical shape of the contour, a size of the contour, a diameter of the contour, or any combination thereof.

11. A method for optimizing a set of optical lens blanks, each optical lens blank of the set of optical lens blanks including a first optical surface, and a second optical surface, the first and second optical surfaces being connected by an external periphery surface, the method comprising:

obtaining a set of data for each optical lens of a set of optical lenses, the set of data including at least contour data representative of the external periphery surface of the respective optical lens, a first dataset representative of the first optical surface of the respective optical lens, and a second dataset representative of the second optical surface of the respective optical lens;

determining a non-zero number and contours of different optical lens blanks includable in the set of optical lens blanks;

determining at least one optical lens blank for the set of optical lens blanks that minimizes material use; and manufacturing a set of optical lenses based on the determined number and contours of the set of optical lens blanks, wherein each optical lens blanks included in the set of optical lens blanks is a semi-finished optical lens blank having a finished surface with a geometrical center reference point and an unfinished surface, wherein during the determining of the non-zero number and contours of different optical lens blanks, a curvature radius of an unfinished surface of the different optical lens blanks is considered, wherein each optical lens blank included in the set of optical lens blanks has a spherical finished surface with a same curvature radius.

* * * * *